United States Patent
Emam et al.

(10) Patent No.: US 8,165,876 B2
(45) Date of Patent: Apr. 24, 2012

(54) METHOD AND APPARATUS FOR DATA CAPTURE USING A VOICE ACTIVATED WORKSTATION

(75) Inventors: Ossama Emam, Mohandessen (EG); Khaled Gamal, Giza (EG)

(73) Assignee: Nuance Communications, Inc., Burlington, MA (US)

( * ) Notice: Subject to any disclaimer, the term of this patent is extended or adjusted under 35 U.S.C. 154(b) by 1057 days.

(21) Appl. No.: 12/089,033

(22) PCT Filed: Sep. 4, 2006

(86) PCT No.: PCT/EP2006/065971
§ 371 (c)(1),
(2), (4) Date: Apr. 2, 2008

(87) PCT Pub. No.: WO2007/039373
PCT Pub. Date: Apr. 12, 2007

(65) Prior Publication Data
US 2008/0235032 A1    Sep. 25, 2008

(30) Foreign Application Priority Data
Oct. 5, 2005    (EP) .................................... 05109267

(51) Int. Cl.
*G10L 15/00*    (2006.01)
(52) U.S. Cl. ......................... 704/235; 704/270; 704/275
(58) Field of Classification Search .................. 704/235, 704/270, 275
See application file for complete search history.

(56) References Cited

U.S. PATENT DOCUMENTS

| | | | |
|---|---|---|---|
| 4,989,253 A * | 1/1991 | Liang et al. | 381/110 |
| 6,405,165 B1 | 6/2002 | Blum et al. | 704/235 |
| 2002/0152079 A1* | 10/2002 | Furuta | 704/275 |
| 2005/0102146 A1* | 5/2005 | Lucas et al. | 704/270 |
| 2005/0178976 A1* | 8/2005 | Steele | 250/440.11 |
| 2005/0197841 A1* | 9/2005 | Al-Dhubaib et al. | 704/270 |

FOREIGN PATENT DOCUMENTS

| | | |
|---|---|---|
| GB | 2217953 A | 1/1989 |
| WO | WO 2007/039373 A1 | 12/2007 |

OTHER PUBLICATIONS

PCT—Notification of Transmittal of the International Search Report and the Written Opinion of the International Searching Authority, or Declaration, Date of mailing Nov. 20, 2006.

(Continued)

*Primary Examiner* — Daniel D Abebe

(74) *Attorney, Agent, or Firm* — Wolf, Greenfield & Sacks, P.C.

(57) ABSTRACT

A method and apparatus for capturing data in a workstation, wherein a large number of data associated with a sample which is viewed, by a user, through an optical device, such as a microscope, is to be entered in a computer related file. The optical device can be moved to a data-sampling position utilizing voice commands. A pointer can then be moved to an appropriate place in the file to receive the data relating to the data-sampling position. Data can be then entered in the appropriate position utilizing a voice command. The steps of moving the pointer and entering the data can then be repeated until all data is provided with respect to the data-sampling positions.

21 Claims, 4 Drawing Sheets

OTHER PUBLICATIONS

Voice-Controlled Microscope Facilitates Intricate Microsurgical Procedures; M.D. Liang, et al; Speech Technology, Man-Machine Voice Communications, Media Dimensions Inc., vol. 4, No. 3, Sep. 1, 1988, pp. 52-54, XP000066497.

A Spoken Dialogue Interface to a Geologists Field Assistant; Dowding, et al.; Proceedings of the HLT-NAACL 2003 Demonstrations, Edmonton, May 2003-Jun. 2003, pp. 9-10, XP002405993.

\* cited by examiner

METHOD AND APPARATUS FOR DATA CAPTURE USING A VOICE ACTIVATED WORKSTATION

PRIORITY TO RELATED PATENT APPLICATION

This patent application claims priority to International Patent Application No. PCT/EP20061065971, entitled "A Method and Apparatus for Data Capture Using a Voice Activated Workstation," which was filed under the Patent Cooperation Treaty (POT) on Sep. 4, 2006, and claims priority to European Patent Application No. 05109267.4 filed with the European Patent Office on Oct. 5, 2005, said applications expressly incorporated herein by reference in their entireties.

TECHNICAL FIELD

The present invention relates to a method and apparatus for data capture, particularly speech recognition, and text to speech technology for generating data reports or other formats in to a method and apparatus.

BACKGROUND OF THE INVENTION

Generating reports and collecting data in complex technology areas is always difficult. There may be a loss of data and this may easily be placed in the wrong column or row. Also if the person generating the report or collecting the data is conducting analysis or reviewing data inputs this can add further difficulties.

One technical area where there are particular issues is the field of petrology. A geoscientist studying rock samples will have to carry out very detailed studies generating huge amounts of data. The accuracy of this data when being collected will be difficult.

In petrology the data collected includes data relating to the composition, origin, structure, and formation of rocks. The branch of petrology concerned with the description and classification of rocks is called petrography.

Petrography is the examination of rocks in this section. Rock slices can be glued to a glass slide and the rock ground to 0.03 mm thickness in order to observe mineralogy and texture using for example a transmitted light petrographic microscope. Samples of sedimentary rock can be impregnated with blue epoxy to highlight porosity, which is the percentage of pore volume, void space, or the volume within rock that can contain fluids.

Micro paleontology is the study of micro fossils of which the majority is too small to be seen without the use of a microscope. Marine micro fossils such as foraminifera are important for stratigraphic correlation.

Palynology is the study of pollen and spores of plants. Changes in the Earth through time can be documented by observing changes in the fossils in successive strata and the environments in which pollen or spores were formed or preserved. Fossils can also be compared with their extant relatives to assess evolutionary changes. Correlations of strata can be aided by studying their fossil content.

A core is a cylindrical sample of rock retrieved from a bore. The average core length is often 60 feet and is generally stored in almost twenty 3-foot long trays. To analyze these core samples a geologist will start with a sheet of paper that contains the core depth in the first column. There are certain categories of columns that could be filled. Each category consists of subcategories that in some cases could add up to 100% more data.

In certain methods of operating, the geologist may use a camera and a petrographic microscope as part of a geological workstation for capturing and verifying geoscientific data in for example a spread sheet.

Typically, a geologist will examine a thin section of the rock sample under the microscope and will manually record the data on paper for later manual input into a table. This table could be a printed sheet of paper or a computer-based spread sheet. There is obviously much room for error in this process.

In petrographic data capture most of the time of the geologist time is spent in going back and forth between the microscope and the paper, identifying minerals and sizes of grains and recording this data. This is also true in micro paleontology and palynology, where geologists have to look at the microscope to identify micro fossils.

In the example of petrographic data collection each record should contain the description of one thin section sample which represents the microscopic evaluation of the sample for mineral and fossil content of the sample and other petrographic properties.

The current way in which this data entry is performed require keyboard input and/or item selection via cursor control keys. There are currently two means or collecting petrographic data using only a microscope and using a microscope and camera.

In the case of the microscope only the geologist uses a transmitted-light petrographic microscope. The sample is divided into 4 zones. The zones are scanned as is shown in FIG. 1 to determine the contents. When a spread sheet of a rock sample description is to be produced, the data first have to be manually recorded in a draft report. The second phase is to create the final report by filling in either another final table or an electronic form displayed on a computer screen.

In the case of using a microscope and a camera connected to a PC, a geologist uses a transmitted-light petrographic microscope and a camera installed over the microscope to transmit the image to a computer screen. The counting is then done as above. When a spread sheet of a rock sample description is to be produced, the data can be directly filled into an electronic form displayed on a computer screen.

Speech recognition systems are sometimes used in the generation of structured reports and filling forms.

U.S. Pat. No. 5,051,924 (Method and Apparatus for the Generation of Reports), for example, discloses a general purpose apparatus for the generation of reports using a speech recognition system and a speech synthesizer to convert the text of the report to synthesized voice signals for storage and retrieval. More particularly, it relates to a system for storing and forwarding selected type of reports in the form of voice signals.

U.S. Pat. No. 5,465,378 (Report Generation System), also discloses a general report generation system which responds to selected user inputs for retrieving corresponding, previously defined report material and then compiles the retrieved material to form the report after the receipt of user inputs representing needed information.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide a system that is reliable in the sense that verification of the entered data will be done on-line during the creation of spread sheet or other document. It is another object of the present invention to allow for hands-free operation for data capture.

It is a further aspect of the present invention to provide a workstation for geologists for at least capturing geoscientific data, the on-line verification of this data and the generation of on-line reports in spread sheet form during the examination of rock thin section samples using a petrographic microscope.

It is another aspect of the present invention to provide a workstation at least able to capture and verify all geoscientific data in a rock lab environment.

It is still another aspect of the present invention to provide a system which substantially standardizes the geoscientific data capture processes and saves time.

The aforementioned aspects and other objectives and advantages can now be achieved as described herein. A method and apparatus is disclosed for capturing data in a workstation, wherein a large number of data associated with a sample which is viewed, by a user, through an optical device, such as a microscope, is to be entered in a computer related file. Such a method and/or system generally includes moving the optical device to a data-sampling position using voice commands; moving a pointer to an appropriate place in the file to receive the data relating to the data-sampling position; entering data in the appropriate position using a voice command; repeating the steps of moving the pointer and entering the data until all data for the data-sampling positions.

Operations involving using voice commands generally includes operations such as speaking one or more words into a microphone to enter data; detecting the one or more words and determining whether they are data or a command; producing instructions for operating elements of the workstation for carrying out any commands; and converting a word into text for any word which constitutes data.

The present invention has the advantage of providing an efficient system of collecting extensive amounts of data in a way that allows the user to expedite the process and guarantee a higher level of quality.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The present invention relates to the use of a camera mounted over transmitted-light Petrographic Microscope, an automatic speech recognition (ASR) system and a text-to-speech (TTS) system in a geological workstation for capturing and verifying of geoscientific data and for generating reports in for example spread sheet form during the examination of rock thin section samples.

Figure 1:
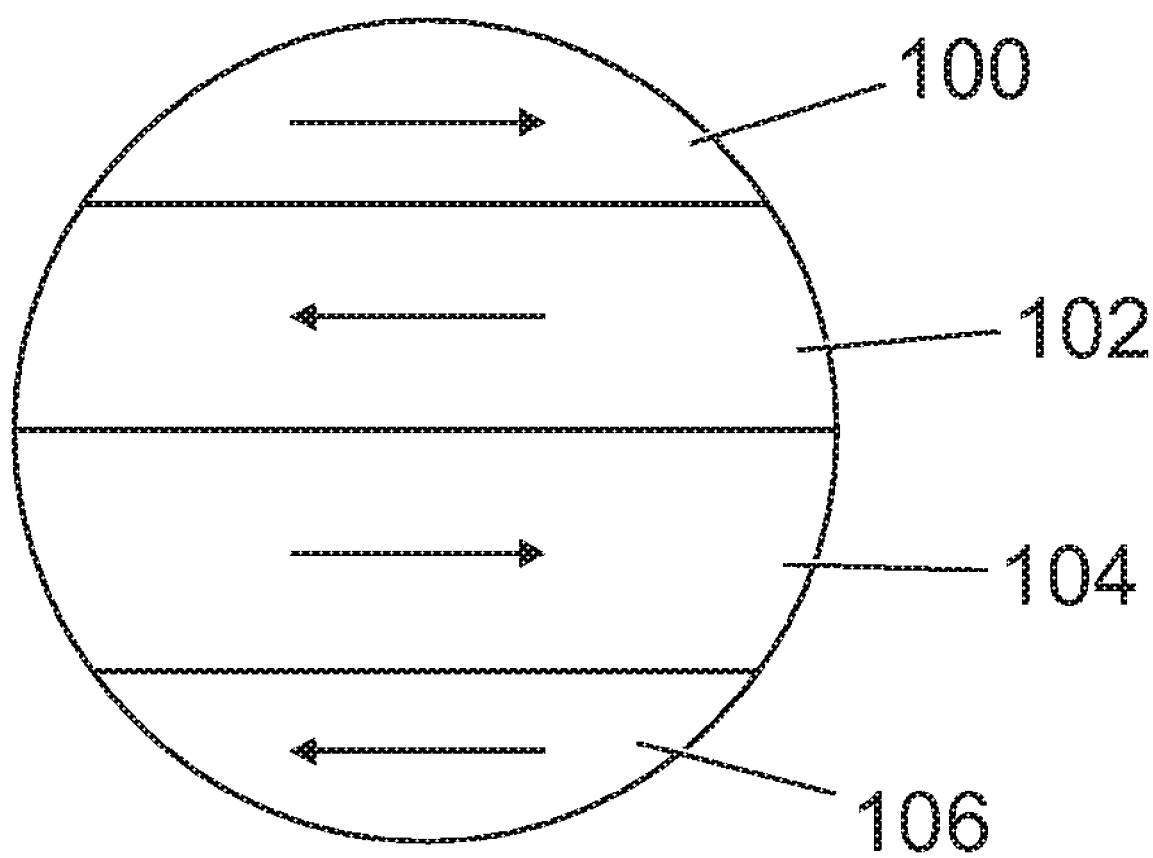
FIG. 1 illustrates a diagram showing direction of analysis of a sample.

FIG. 1 illustrates a diagram depicting the direction of analysis of a sample, as indicated by regions 100, 102, 104, and 106.

Figure 2:
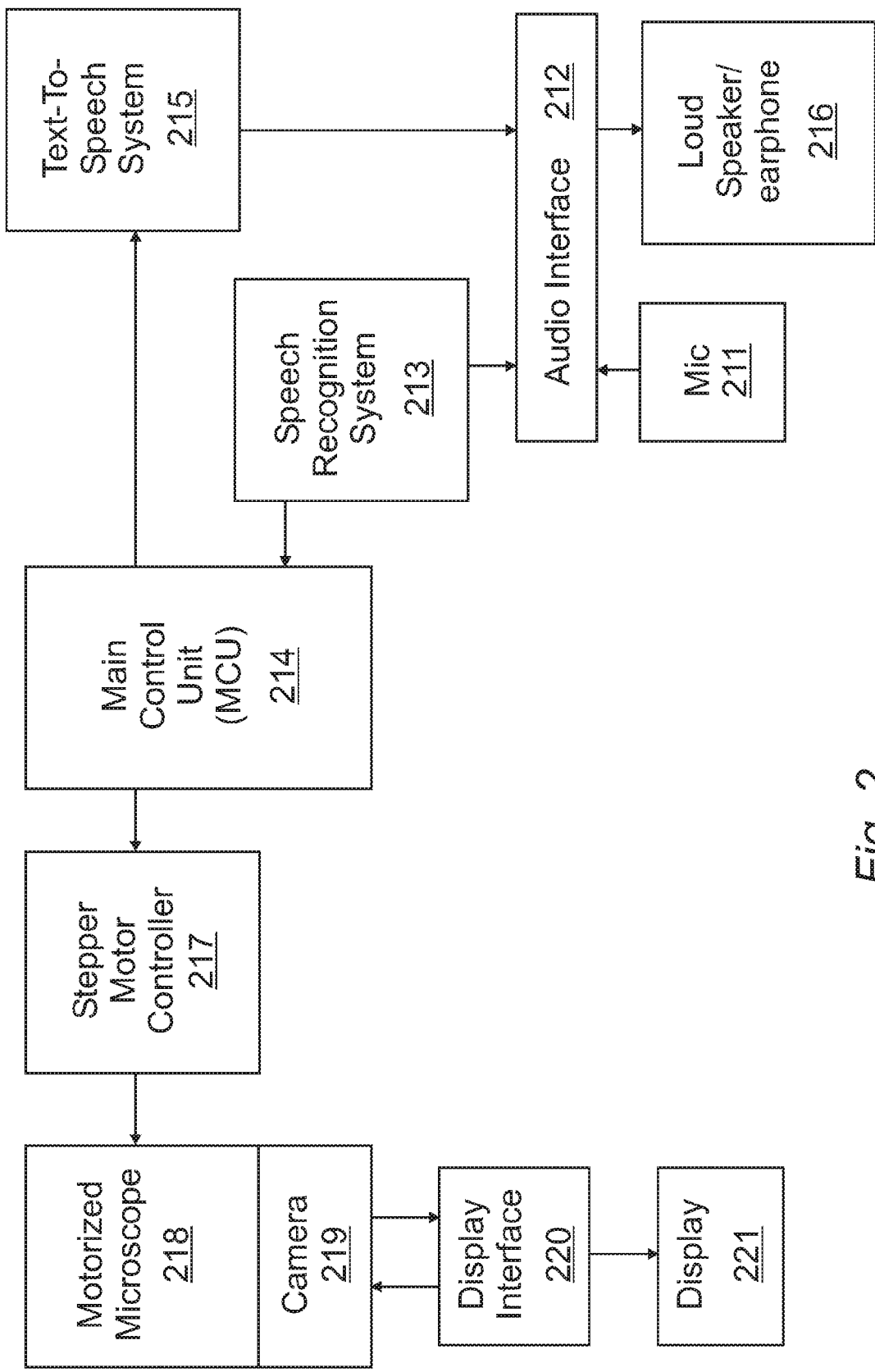
FIG. 2 illustrates a schematic block diagram of a preferred embodiment of the subject invention.

FIG. 2 illustrates a schematic block diagram of the system of the present invention. The system includes a microphone 211 or other voice input means attached to an audio interface 212 which converts the speech signal into digital data that can be processed by a speech recognition system 213. The speech recognition system 213 is for example any conventional, commercially available speech recognition system such as the system marketed by International Business Machines (IBM) Corp. under the trademark ViaVoice.

Generally speech recognition systems are designed to recognize selected vocabularies and allow also for the addition of user-specific vocabulary. The speech recognizer, is generally a speaker-dependent system, that is, each user must train the system to recognize a vocabulary in his/her voice.

Once spoken words are recognized by voice recognition system 213, recognized text is sent to the Main Control Unit (MCU) 214. The MCU 214 is responsible for the generation and control of a spread sheet form as well as the control of a motorized microscope 218 through a stepper motor controller 217. The MCU 214 will be described in more detail later. The MCU 214 sends a confirmation text message to the text-to-speech system (TTS) 215. An example of the TTS system is a system such as the system marketed by International Business Machines (IBM) Corp. under the trademark "ViaVoice Outloud".

The TTS systems receive a sequence of words, typically coded in ASCII, and generate a selected corresponding voice signal. The synthesized voice signals are output to a speaker (or earphones) 216 through the audio interface 212.

The MCU 214 sends a control command to the stepper motor controller 217 that is capable of moving the microscope at step sizes as small as 0.01 micron for X, Y and 0.002 micron for Z movement, A camera 219 mounted over the motorized microscope 218 is attached to a display interface 220 and converts the captured pictures into digital data that can be displayed on a display 221.

A user may thus look at a sample through the microscope using pictures generated by the camera and microscope arrangement and record data relating to the sample in say a spread sheet using a combination of speech recognition and text to speech processes.

Figure 3:
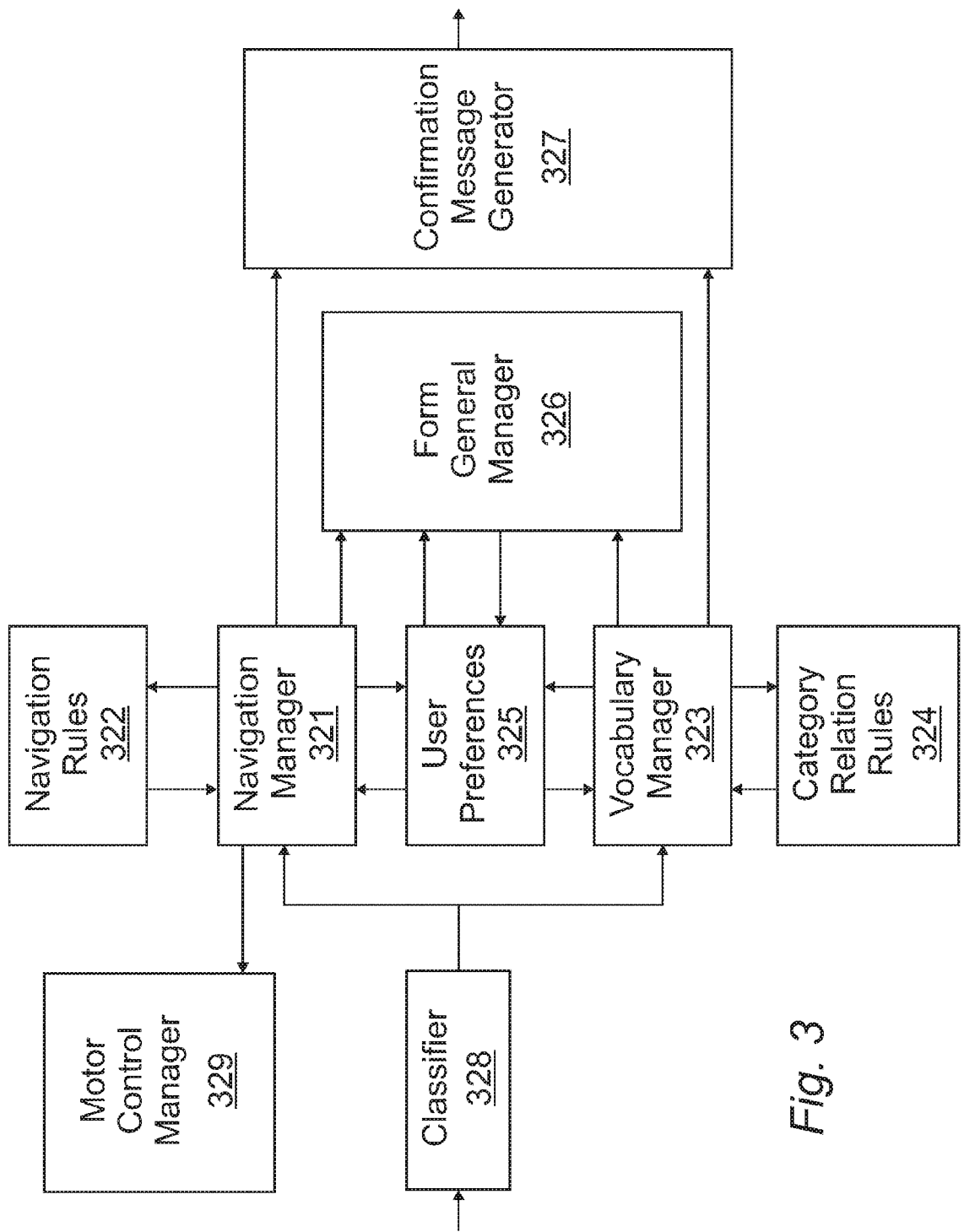
FIG. 3 illustrates a schematic detailed block diagram of a Main Control Unit (MCU) of the preferred embodiment depicted in FIG. 2.

The Main Control Unit (MCU) 214 is shown in more detail in FIG. 3. This shows the main elements of the system that are responsible for the generation and control of the spread sheet as well as the control of the motorized microscope. The output recognized text from the speech recognition system 213 is the input to the MCU. The input text is first fed to the classifier 328 that will direct it to either the navigation manager 321 or to the vocabulary manager 323 based on whether the recognized text is a control command or a legal word (entry) that is part of the vocabulary belonging to the current active column of the spread sheet for example.

The navigation manager 321 is the component that is responsible for the interpretation of the spoken voice command and will decide the appropriate action based on a set of predefined rules 322. The action will be sent either to the form generation manager 326 or to the motor control manager 329 for execution. For instance, if the current cursor position is at column x and row y, the spoken command "move up N", if recognized by the speech recognizer, will cause the cursor to move up to row y-N in the same column x. On the other hand, the spoken command "move focus right N", if recognized, will cause the microscope stage to move right N steps (where the step size is to be set by the user in the user preferences 325). The navigation manager will also trigger the confirmation message generator 327 to generate a message to alert the user of the action that has been taken.

The vocabulary manager 323 is the component that is responsible for the interpretation of the spoken data and will fill in the spread sheet with the appropriate entry based on a set of predefined relations 324 between the different members of the same category of data. In other words phrases or words which are common place or normal for the column in question.

Figure 4:
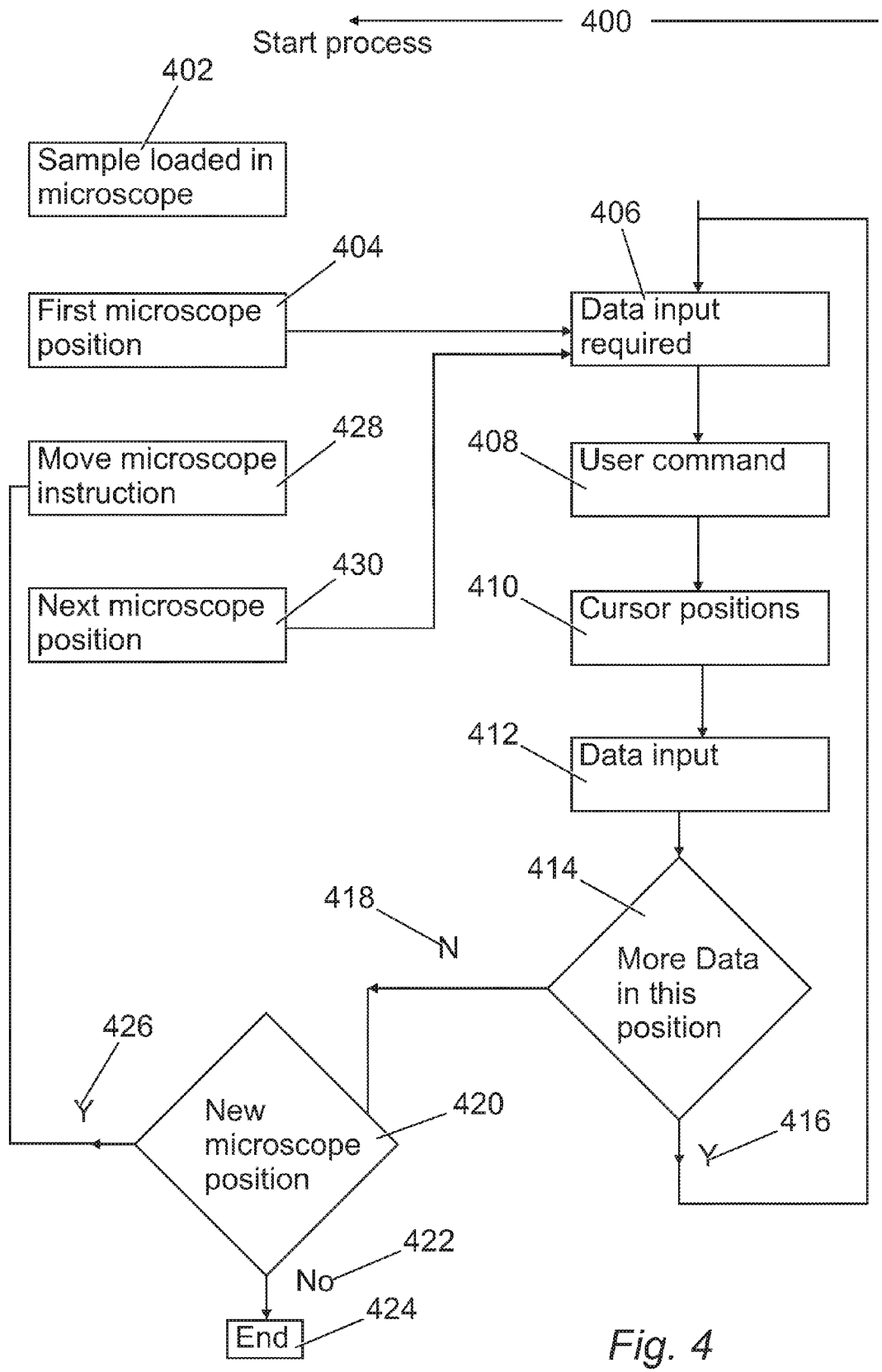
FIG. 4 illustrates a flow chart depicting logical operational steps for carrying out the method of the present invention in accordance with a preferred embodiment.

Referring now to FIG. 4, a flow chart of logical operations depicting the method of the present invention is shown. The process begins, as indicated (400). Thereafter, as depicted at block 402, a sample is loaded into the microscope. Next, as indicated at block 404, the first microscope position is established. The movement of the microscope can be effected utilizing voice commands, the speech recognition of other voice commands (i.e., by system 213) and then movement of the microscope by the stepper motor in accordance therewith. It is clear that other means of moving the microscope can alternatively be utilized. Once the first microscope position is achieved the data input stage commences, as indicated at block 406.

This establishes opening of the computer file into which data it to be loaded (for example a spread sheet, database etc); connection of the user to the speech recognition, text recognition and MCU systems; establishment of visual means by which the user can see the sample; and/or connection to an audio interface which enables the user to hear commands and other information.

The user can now input a command as illustrated at block 408. The first command will position the cursor in the computer file in the appropriate location for data input as depicted at block 410. The user then makes the necessary data input as illustrated at block 412.

The data input is made via voice commands and uses the resources of FIGS. 2-3 to accurately select the relevant text for entry into the computer file, as has previously been described.

A determination is then made as to whether or not more data is to be entered into the computer file at the same microscope position as indicated at block 414. If yes (416), then the process loops back to process the operation illustrated at block 406 and the cycle of steps depicted at blocks 408-414 are repeated until the answer to the operation depicted at block 414 is no (418). When the answer is no, a determination is made as to whether or not a new microscope position is required as indicated at block 420. If no (422) the process ends as described at block 424. If yes (426) the system effects a step of moving the microscope as depicted at block 428. This establishes a next microscope position as indicated at block 430. The system then loops back to process the operation indicated at block 406 and repeats the operational steps illustrated at block 406-414 until the answer for the operation depicted at block 414 is no.

This system and method has been described with reference to geological data input. It may be useful in other technical fields where lots of data needs to be stored in a computer file whilst a user is looking at samples through an optical input, such as for example a microscope.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of capturing, for entry in a computer record, data associated with a sample viewed by a user through an optical device, said method comprising:
   in response to a voice command, moving the optical device to a first data-sampling position;
   moving a pointer to a position in the computer record appropriate to receive input relating to said first data-sampling position;
   receiving voice input regarding the sample;
   based on the voice input, entering data in the computer record at the position appropriate to receive input relating to the first data-sampling position;
   moving, in accordance with an automated process specifying a second data-sampling position, the optical device to the second data-sampling position;
   receiving voice input relating to the second data-sampling position; and
   entering, based on the voice input, data in the computer record at a position in the computer record appropriate to receive input relating to the second data-sampling position.

2. The method of claim 1, further comprising:
   detecting at least one word spoken by the user and determining whether said at least one word comprises data or a command;
   producing instructions for operating elements of the workstation for carrying out any commands; and
   converting said at least one word into text for any word which constitutes data.

3. The method of claim 1, wherein moving said optical device comprises moving the optical device utilizing a stepper motor.

4. The method of claim 2 wherein detecting said at least one word comprises:
   recognizing said at least one word utilizing a speech recognition system;
   directing said at least one word recognized as commands to a navigation manager and said at least one word recognized as data to a vocabulary manager.

5. The method of claim 4, further comprising:
   receiving said commands at a navigation manager;
   comparing said at least one word comprising commands with a set of predefined rules; and
   generating instruction to move the optical device or the pointer in accordance with said set of predefined rules.

6. The method of claim 4 further comprising:
   receiving said data at a vocabulary manager;
   interpreting said at least one word comprising data to determine an appropriate entry based on a set of predefined relationships between a position of the pointer at the time of the interpreting and available data.

7. The method of claim 2 further comprising feeding back said at least one word to said user utilizing an audio device on entry of said at least one word through said microphone.

8. The method of claim 1 wherein said entering data further comprises entering said data into a spread sheet.

9. A method of capturing, for entry in a computer record, data associated with a sample viewed by a user through an optical device, said method comprising:

in response to a voice command, moving the optical device to a plurality of data-sampling positions; and for a data-sampling position of the plurality of data-sampling positions,
- moving a pointer to a position in the computer record appropriate to receive input relating to said data-sampling position,
- receiving voice input regarding the sample, and
- based on the voice input, entering data in the computer record at the position.

10. The method of claim 9, wherein receiving voice input regarding the sample comprises receiving information regarding geological data obtained by the user utilizing a microscope and display arrangement as said optical device.

11. The method of claim 9, wherein moving said optical device comprises moving the optical device utilizing a stepper motor.

12. The method of claim 9, further comprising detecting at least one word spoken by the user at least in part by:
- recognizing said at least one word utilizing a speech recognition system;
- directing said at least one word recognized as commands to a navigation manager and said at least one word recognized as data to a vocabulary manager.

13. The method of claim 12 further comprising:
receiving said commands at a navigation manager;
comparing said at least one word comprising commands with a set of predefined rules;
generating instruction to move the optical device or the pointer in accordance with said set of predefined rules.

14. The method of claim 12 further comprising:
receiving said data at a vocabulary manager;
interpreting said at least one word comprising data to determine an appropriate entry based on a set of predefined relationships between said position of the pointer and available data.

15. At least one non-transitory computer-usable medium encoded with computer program code that, when executed by at least one processor, causes the at least one processor to carry out a method of capturing, for entry in a computer record, data associated with a sample viewed by a user through an optical device, the method comprising:
in response to a voice command, moving the optical device to a first data-sampling position;
moving a pointer to a position in the computer record appropriate to receive input relating to said first data-sampling position;
receiving voice input regarding the sample;
based on the voice input, entering data in the computer record at the position appropriate to receive input relating to the first data-sampling position; and in further response to the voice command, moving the optical device to a second data-sampling position;
receiving voice input relating to the second data-sampling position; and
entering, based on the voice input, data in the computer record at a position in the computer record appropriate to receive input relating to the second data-sampling position.

16. The at least one non-transitory computer-usable medium of claim 15, wherein the method further comprises:
detecting at least one word spoken by the user and determining whether said at least one word comprises data or a command;
producing instructions for operating elements of the workstation for carrying out any commands; and
converting said at least one word into text for any word which constitutes data.

17. The at least one non-transitory computer-usable medium of claim 15, wherein receiving voice input regarding the sample comprises receiving information regarding capturing geological data obtained by the user utilizing a microscope and display arrangement as said optical device.

18. The at least one non-transitory computer-usable medium of claim 15, wherein moving said optical device comprising moving the optical device utilizing a stepper motor.

19. The at least one non-transitory computer-usable medium of claim 16, wherein the method further comprises:
recognizing said at least one word utilizing a speech recognition system;
directing said at least one word recognized as commands to a navigation manager and said at least one word recognized as data to a vocabulary manager.

20. The at least one non-transitory computer-usable medium of claim 19, wherein the method further comprises:
receiving said commands at a navigation manager;
comparing said at least one word comprising commands with a set of predefined rules;
generating instruction to move the optical device or the pointer in accordance with said set of predefined rules.

21. The at least one non-transitory computer-usable medium of claim 19, wherein the method further comprises:
receiving said data at a vocabulary manager;
interpreting said at least one word comprising data to determine an appropriate entry based on a set of predefined relationships between said position of the pointer and available data.

* * * * *